United States Patent
Lin (10) Patent No.: US 10,437,436 B2
(45) Date of Patent: Oct. 8, 2019

(54) CONTROL METHOD FOR SWITCHING PLAYLIST OF PLAY SYSTEM AND APPARATUS

(71) Applicant: Guang Dong Oppo Mobile Telecommunications Corp., Ltd., Dongguan (CN)

(72) Inventor: Shangbo Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 469 days.

(21) Appl. No.: 15/190,194

(22) Filed: Jun. 23, 2016

(65) Prior Publication Data

US 2017/0031552 A1 Feb. 2, 2017

(30) Foreign Application Priority Data

Jul. 29, 2015 (CN) .......................... 2015 1 0456444

(51) Int. Cl.
| | |
|---|---|
| *G06F 3/048* | (2013.01) |
| *H04L 29/06* | (2006.01) |
| *G06F 3/0484* | (2013.01) |
| *G06F 3/0482* | (2013.01) |
| *G06F 3/16* | (2006.01) |

(52) U.S. Cl.
CPC .......... *G06F 3/0484* (2013.01); *G06F 3/0482* (2013.01); *G06F 3/165* (2013.01); *H04L 65/1083* (2013.01); *H04L 65/4007* (2013.01); *H04L 65/4069* (2013.01)

(58) Field of Classification Search
CPC .............. G06F 17/30772; G06F 3/165; H04N 21/43615; H04N 21/8113
See application file for complete search history.

(56) References Cited

U.S. PATENT DOCUMENTS

| | | | |
|---|---|---|---|
| 7,571,014 B1 * | 8/2009 | Lambourne ............ | H04R 27/00 700/94 |
| 8,005,987 B2 | 8/2011 | Richardson et al. | |
| (Continued) | | | |

FOREIGN PATENT DOCUMENTS

| | | |
|---|---|---|
| CN | 101072359 | 11/2007 |
| CN | 101517554 A | 8/2009 |
| (Continued) | | |

*Primary Examiner* — Scott T Baderman
*Assistant Examiner* — Mario M Velez-Lopez (57) ABSTRACT

A control method for switching a playlist of a play system and apparatus are provided. The method includes receiving an identification change operation of a graphic label corresponding to a play status of a first play group on a user interface so that the identification change operation of the graphic label corresponding to the first play group is consistent with an identification change operation of a graphic label corresponding to a play status of a second play group; transmitting an acquisition instruction of a playlist to the first play group so that the first play group acquires a current playlist and a current play progress of the second play group via the local area network; and controlling at least one playing device of first play group for playing the play files of current playlist of second play group according to the current play progress of second play group.

11 Claims, 5 Drawing Sheets

(56) References Cited

U.S. PATENT DOCUMENTS

| | | | | |
|---|---|---|---|---|
| 8,290,603 B1* | 10/2012 | Lambourne | ............ | G11B 27/00 |
| | | | | 700/94 |
| 9,094,706 B2* | 7/2015 | Reily | ................ | H04N 21/4126 |
| 9,654,073 B2* | 5/2017 | Apodaca | .................. | H03G 3/02 |
| 9,654,545 B2* | 5/2017 | Gossain | ................ | H04L 67/325 |
| 9,665,339 B2* | 5/2017 | Reimann | ............... | G06F 3/0484 |
| 9,778,897 B2* | 10/2017 | Millington | ............ | H04J 3/0664 |
| 9,778,900 B2* | 10/2017 | Millington | ............ | H04J 3/0664 |
| 9,874,997 B2* | 1/2018 | Clayton | .................. | G06F 16/48 |
| 9,898,246 B2* | 2/2018 | Kumar | ................... | H04R 27/00 |
| 9,904,730 B2* | 2/2018 | Coburn, IV | ......... | G06F 16/639 |
| 9,924,221 B2* | 3/2018 | Coburn, IV | ....... | H04N 21/4227 |
| 9,959,087 B2* | 5/2018 | Corbin | ................... | H04L 51/32 |
| 9,965,244 B2* | 5/2018 | Reichert | ................ | G08C 17/02 |
| 10,097,893 B2* | 10/2018 | Kuper | ............. | H04N 21/43615 |
| 10,209,948 B2* | 2/2019 | Morganstern | ........... | G06F 3/165 |
| 10,275,138 B2* | 4/2019 | Vega | ................... | G06F 3/04842 |
| 2013/0231044 A1* | 9/2013 | Wang | .................... | H04H 20/72 |
| | | | | 455/3.06 |
| 2014/0176298 A1 | 6/2014 | Kumar et al. | | |
| 2014/0181655 A1* | 6/2014 | Kumar | ................... | G06F 3/165 |
| | | | | 715/716 |
| 2014/0344690 A1 | 11/2014 | Kuhn et al. | | |
| 2015/0128194 A1 | 5/2015 | Kuang et al. | | |

FOREIGN PATENT DOCUMENTS

| | | |
|---|---|---|
| CN | 102970589 | 3/2013 |
| CN | 104301780 A | 1/2015 |
| CN | 104616675 A | 5/2015 |
| CN | 104778959 | 7/2015 |

\* cited by examiner

CONTROL METHOD FOR SWITCHING PLAYLIST OF PLAY SYSTEM AND APPARATUS

CROSS-REFERENCE TO RELATED APPLICATIONS

Benefit is claimed to China Patent Application No. 201510456444.0, filed Jul. 29, 2015, the contents of which are incorporated by reference herein in their entirety.

BACKGROUND

Field

The present disclosure relates to a technical field of smart home, and more particularly to a control method for switching a playlist of a play system and apparatus.

Background

In smart homes and intelligent terminals, a play system may include a plurality of playing devices integrated with a network communication function. Thus, the playing devices disposed in the play system can construct a network topology. The play system may be coupled to the Internet to acquire play files over the Internet network, to play the play files in a local storage, or to play the play files stored in the playing devices within the local area network. The play system is controlled by the intelligent terminal, such as a smartphone, a tablet personal computer or a smart wearable device, where the intelligent terminal controls the play system in order to forward the play files on the Internet to the play system for playing.

The playing devices within the play system are capable of playing the same play files synchronously. Furthermore, the playing devices are classified into a plurality of play groups where each play group plays different play files. For example, a music system includes six sets of playing devices A, B, C, D, E and F where the playing devices A and B form a play group 1, the playing devices C and D form a play group 2, and the playing devices E and F form a play group 3. The playing devices A and B in the play group 1 are capable of simultaneously playing the same play files, the playing devices C and D in the play group 2 are simultaneously capable of playing the same play files, and the playing devices E and F in the play group 3 are also capable of simultaneously playing the same play files. The independent play group 1, play group 2, and play group 3 can play the same or different songs. Each play group is controlled by the different intelligent terminals or the same intelligent terminal. Each play group may include an independent playlist, two or more play groups share a playlist, and two or more play groups synchronously play the songs in the same playlist.

When a client uses a play group to listen to music, the client sometimes hopes to fast forward the music, which is played by a current play group, to other play groups for playing. For example, when the play group 1 composed of three sets of playing devices in the living room is playing the music, the client hopes to forward the music, which is played by the play group 1, to the play group 2, which is composed of two sets of playing devices, in the bedroom so that the five sets of playing devices of the play groups 1 and 2 simultaneously play the same songs. Generally, the two sets of playing devices in the play group 2 are added to the play group 1. However, if so, the play group 2 will be disassembled so that it is required to assemble the two sets of disassembled playing devices in the play group 1 so as to form the play group 2 again when the client desires to use the two sets of playing devices in the bedroom at the next time. In this case, it is quite inconvenient for the user.

For another example, when listening to the music using one playing device of the play group 3 in the garden, the client returns to the living room after a while and desires to listen the music which is played earlier in the garden by the play group 3 such that the three sets of playing devices of the paying group 1 in the living room is then capable of playing the playlist of the play group 3 in the garden and the play group 3 in the garden stops playing the music. Conventional practice is that the three sets of playing devices in the play group 1 in the living room are added to the play group 3 for simultaneously playing the music and the one playing device of the play group 3 in the garden is removed from the play group 3 or is switched to standby mode. Such operations which result in the disassembly/re-assembly of the playing devices of the play groups are considerably inconvenient.

BRIEF DESCRIPTION OF THE DRAWINGS

To describe the technical solutions of the present application more clearly, the accompanying drawings for illustrating at least one embodiment will be introduced briefly in the following. Apparently, the accompanying drawings in the following description are only some embodiments of the present application, and a person of ordinary skill in the art may obtain other drawings based on these accompanying drawings without creative efforts.

DETAILED DESCRIPTION OF THE PREFERRED EMBODIMENTS

The following embodiments refer to the accompanying drawings for exemplifying specific implementable embodiments of the present disclosure. It should be noted that the exemplary described embodiments are configured to describe and understand the present disclosure, but the present disclosure is not limited thereto.

Based on the above-mentioned drawbacks, one objective of the present disclosure is to provide a control method for switching a playlist of a play system and apparatus to solve the problem of disassembling/re-assembling the play groups when the play group switches the playlist.

In one embodiment, the present disclosure provides a control method of a control apparatus for switching a playlist of a play system, wherein the play system includes at least two play groups and each play group includes at least one playing device, and the at least two play groups are coupled to each other via a local area network. The control method includes:

receiving, by a receiving unit of the control apparatus, an identification change operation of a graphic label corresponding to a play status of a first play group on a user interface so that the identification change operation of the graphic label corresponding to the first play group is consistent with an identification change operation of a graphic label corresponding to a play status of a second play group;

transmitting, by a transmitting unit of the control apparatus, an acquisition instruction of the playlist to the first play group so that the first play group acquires a current playlist and a current play progress of the second play group via the local area network; and controlling, by a control unit of the control apparatus, at least one playing device of the first play group for playing a play file of the current playlist of the second play group according to the current play progress of the second play group.

In at least one embodiment, the control method further includes:

receiving, by the receiving unit, the identification change operation of the graphic label corresponding to the second play group so that the identification change of the graphic label corresponding to the second play group becomes a predetermined identification wherein the predetermined identification corresponds to an idle status of the second play group; and controlling, by the control unit, the second play group to stop playing the play file of the current playlist.

In at least one embodiment, while transmitting the acquisition instruction of the playlist to the first play group, the control method further includes: after a predetermined time of the identification change operation of the graphic label corresponding to the first play group on the user interface is received by the receiving unit, the acquisition instruction of the playlist is transmitted to the first play group by the transmitting unit.

In at least one embodiment, the control method further includes: configuring, by a configuring unit of the control apparatus, identifications respectively corresponding to the play status and an idle status of each play group.

In at least one embodiment, the identifications are either colors or patterns of the graphic labels.

In at least one embodiment, an identification of the play status in each play group is different from each other.

In at least one embodiment, an identification of an idle status of each play group is the same as each other or different from each other.

In at least one embodiment, the first play group acquires the current playlist and the current play progress of the second play group via the local area network.

In another embodiment, the present disclosure provides a control apparatus for switching a playlist of a play system, where the play system includes at least two play groups and each play group includes at least one playing device, and the at least two play groups are coupled via a local area network. The control apparatus includes:

a receiving unit, configured to receive an identification change operation of a graphic label corresponding to a play status of a first play group on a user interface so that the identification change operation of the graphic label corresponding to the first play group is consistent with an identification change operation of a graphic label corresponding to a play status of a second play group;

a transmitting unit, configured to transmit an acquisition instruction of the playlist to the first play group so that the first play group acquires a current playlist and a current play progress of the second play group via the local area network; and a control unit, configured to control at least one playing device of first play group for playing a play file of the current playlist of the second play group according to the current play progress of second play group.

In at least one embodiment, the control apparatus further includes:

the receiving unit is configured to receive the identification change operation of the graphic label corresponding to the second play group so that the identification change of the graphic label corresponding to the second play group becomes a predetermined identification where the predetermined identification corresponds to the idle status of the second play group; and the control unit is configured to control the second play group to stop playing the play file of the current playlist.

In at least one embodiment, the control apparatus further includes: the transmitting unit is further configured to transmit the acquisition instruction of the playlist to the first play group after a predetermined time of the identification change operation of the graphic label corresponding to the first play group on the user interface is received by the receiving unit.

In at least one embodiment, the control apparatus further includes: a configuration unit configured to configure identifications respectively corresponding to the play status and an idle status of each play group.

In at least one embodiment, the identifications are either colors or patterns of the graphic labels.

In at least one embodiment, the control apparatus further includes: a configuration unit configured to configure identifications respectively corresponding to the play status of each play group, an idle status of the first play group and the idle status of the second play group.

In at least one embodiment, the control apparatus further includes: a configuration unit configured to configure identifications respectively corresponding to the play status and an idle status of each play group.

In at least one embodiment, the control apparatus further includes: an identification of the play status in each play group is different from each other, and an identification of an idle status of each play group is the same as each other or different from each other.

In at least one embodiment, the first play group acquires the current playlist and the current play progress of the second play group via the local area network.

Still in another embodiment, a computing device including a computer readable media and the above-described control apparatus, wherein the computer readable media stores therein at least one application program, and wherein when the control apparatus executes the at least one application program, the control apparatus performs the above-described control method.

Accompanied with FIGS. 1-3d, the control method for switching a playlist of a play system is described in the following.

Figure 1:
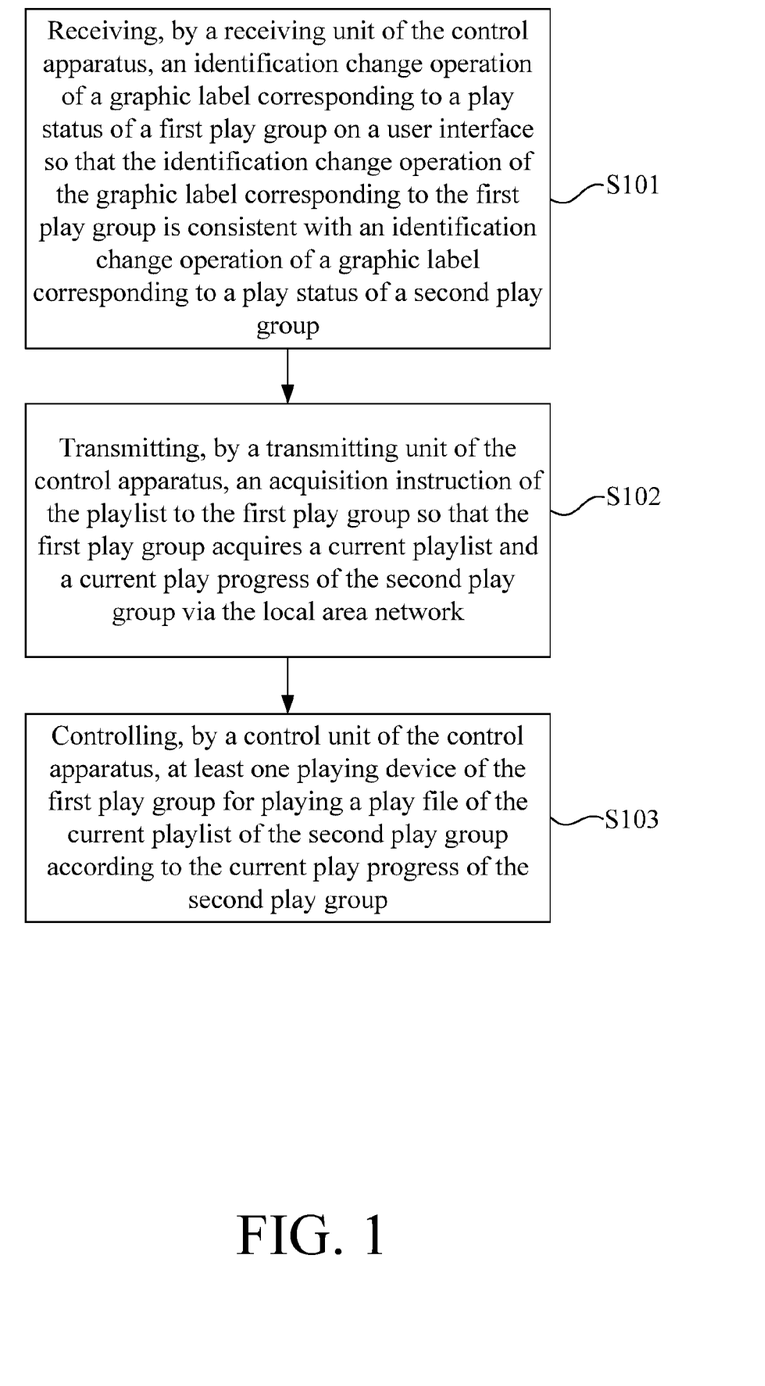
FIG. 1 is a flow chart of a control method for switching a playlist of a play system according to one embodiment of the present disclosure.

Please refer to FIG. 1, which is a flow chart of a control method for switching a playlist of a play system according to one embodiment of the present disclosure. The control method begins at block 101.

In block S101, an identification change operation of a graphic label corresponding to a first play group on a user interface is received so that the identification change operation of the graphic label corresponding to the first play group is consistent with an identification change operation of a graphic label corresponding to a play status of a second play group.

The present disclosure utilizes an intelligent terminal to switch and control the playlist of the play system, and the play group is displayed on the user interface of the intelligent terminal. Each of the play groups is displayed as a graphic label which occupies a display region on the user interface where the graphic label is a rectangular shape, circular shape or other different shapes. The name and status information of the play group is shown on the graphic label where the status information includes a title of song, which is currently played by the play group, and a playing status, such as a play or pause mode. If the play group currently has no playlist, the status information of the play group is empty. If the graphic label of one play group is clicked, the user enters an information interface of the play group which displays more detailed information corresponding to the play group where the detailed information includes the features of showing which playing devices compose the play group, browsing and editing the playlist of the play group.

Each play group remains in a play or an idle status of which graphic label correspondingly shows different identification where the identifications may be different colors or patterns. The identification of the play status in each play group is different but the identification of the idle status of each play group is the same as each other or different from each other.

If the finger touches the graphic label of the play group on the intelligent terminal to slide the graphic label, the identification of the graphic label will change once at a sliding time until the identification of the graphic label of the play group is consistent with a graphic label of a target play group where the identification is changed between the given identifications of the graphic label on the user interface. The operations of touching and sliding the graphic label can be replaced with other operations, such as a sliding operation of the graphic label along different directions, a pressing operation of the graphic label for longer time, or other operations combined with physical buttons of intelligent terminal. The intelligent terminal receives the identification change operation of the graphic label corresponding to the first play group on the user interface.

In block S102, an acquisition instruction of the playlist is transmitted to the first play group so that the first play group acquires a current playlist and a current play progress of the second play group via the local area network.

After the identification change operation of the graphic label corresponding to the play group is received, the acquisition instruction of the playlist is transmitted to the play group for triggering the first play group to acquire the current playlist and the current play progress of the target play group by the local area network. The playing devices of the play group are coupled to each other within the network. Therefore, in one embodiment, a control terminal of the play group is capable of acquiring the current playlist and the current play progress of the target play group from the control terminal of the target play group. In another embodiment, the current playlist and the current play progress is stored in one playing device of the target play group so that the control terminal can acquire the current playlist and the current play progress in the one playing device of the target play group. Still in another embodiment, the play group and the target play group are controlled by the same control terminal so that the control terminal is capable of acquiring acquire the current playlist and the current play progress of the target play group from its own information.

In block S103, at least one playing device of first play group is controlled for playing the play files of the current playlist of the second play group according to the current play progress of second play group.

After acquiring the current playlist and the current play progress of the target play group, the control terminal is configured to control the play group in order to synchronously play the play files of current playlist of target play group according to the current play progress.

In a control method for switching a playlist of a play system according to one embodiment of the present disclosure, by consisting an identification of the graphic label of the play group with an identification of the graphic label of another current play group which is playing, the current playlist played by another play group is acquired and there is no need to re-assemble the play groups when the play files of the playlist are played, thereby conveniently simplifying the operations.

Figure 2:
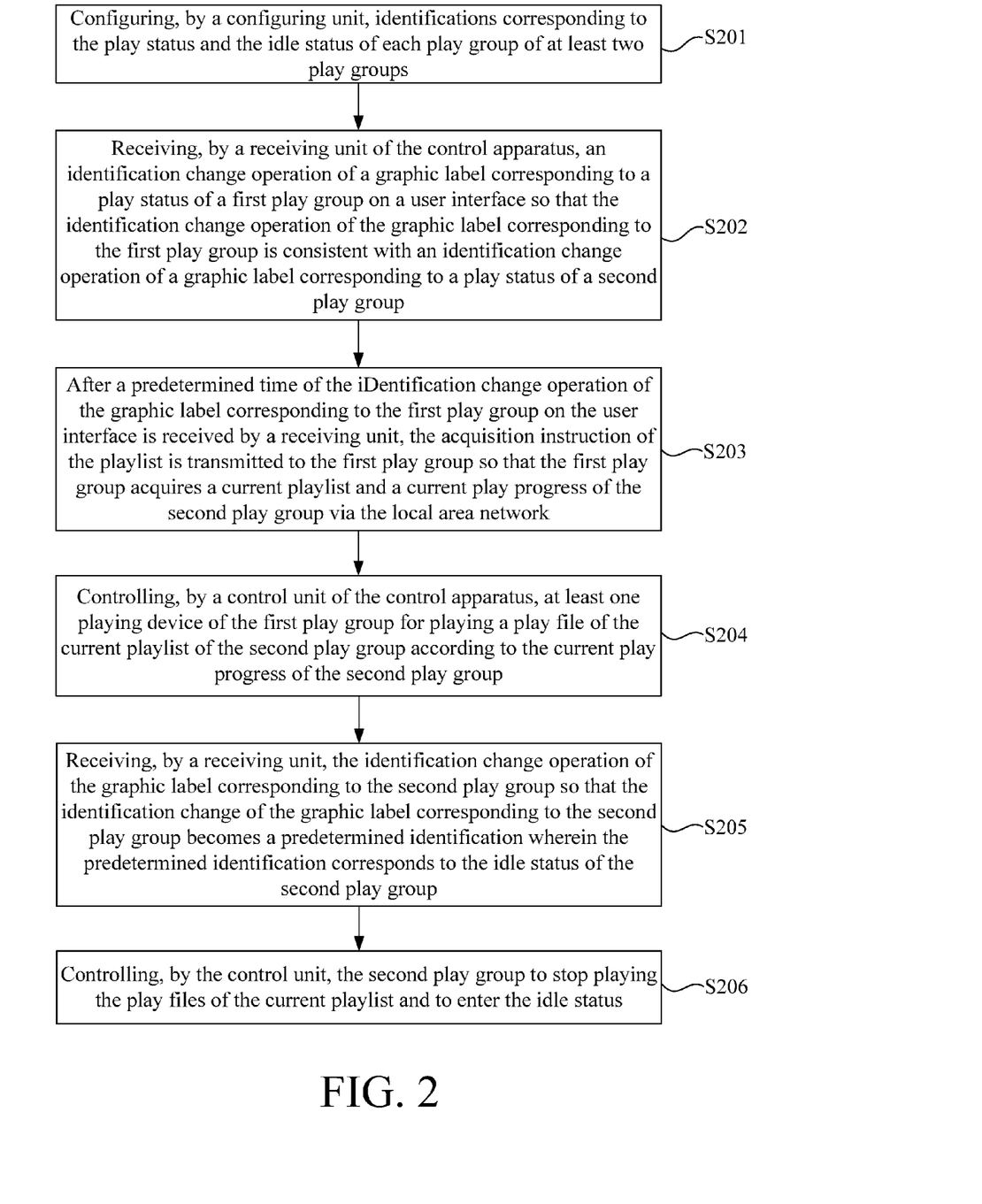
FIG. 2 is a flow chart of a control method for switching the playlist of the play system according to another embodiment of the present disclosure.

Please refer to FIG. 2, which is a flow chart of a control method for switching the playlist of the play system according to another embodiment of the present disclosure. The control method begins at block S201.

In block S201, identifications corresponding to the play status and the idle status of each play group of at least two play groups are configured.

Each play group is configured to be in the play status or idle status of which graphic label correspondingly shows different identification where the identifications can be different colors or patterns of the graphic label. The identification of the play status in each play group is different but the identification of the idle status of each play group is the same as each other or different from each other.

Figure 3A:
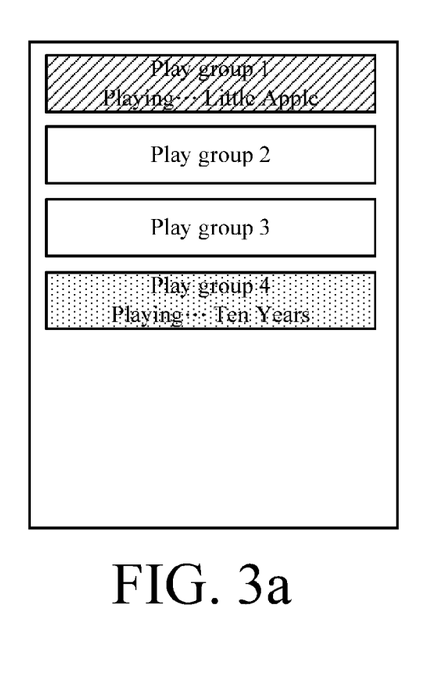
FIGS. 3*a*-3*d* are schematic view of a user interface of the related play groups according to one embodiment of the present disclosure.

For an example of a music system, FIG. 3a is a user interface of the related play groups. The user interface displays four play groups of the music system including a play group 1, a play group 2, a play group 3, and a play group 3 where the play groups 1 and 4 are in a play status, which are added by a playlist and can be configured in a play status or a pause status, and the play groups 2 and 3 are in an idle status.

In FIG. 3, if a play group is in the idle status, i.e. no playing music, the graphic label of the play group shows a default pattern, such as a blank pattern. If the play group is in the play status, the graphic label of the play group shows a predetermined pattern. Moreover, when many play groups are in the play status, the graphic labels of play groups are configured to be different patterns respectively. As shown in FIG. 3a, the idle play groups 2 and 3 are configured to be a default blank pattern, the play group 1 with the play status is configured to be a slanting pattern, and the play group 4 with the play status is configured as a dot pattern.

In block S202, an identification change operation of a graphic label corresponding to a first play group on a user interface is received so that the identification change operation of the graphic label corresponding to the first play group is consistent with an identification change operation of a graphic label corresponding to a play status of a second play group.

In block S203, after a predetermined time of the identification change operation of the graphic label corresponding to the first play group on the user interface is received, the acquisition instruction of the playlist is transmitted to the first play group so that the first play group acquires a current playlist and a current play progress of the second play group via the local area network.

In block S204, at least one playing device of first play group is controlled for playing the play files of current playlist of second play group according to the current play progress of second play group.

Figure 3B:
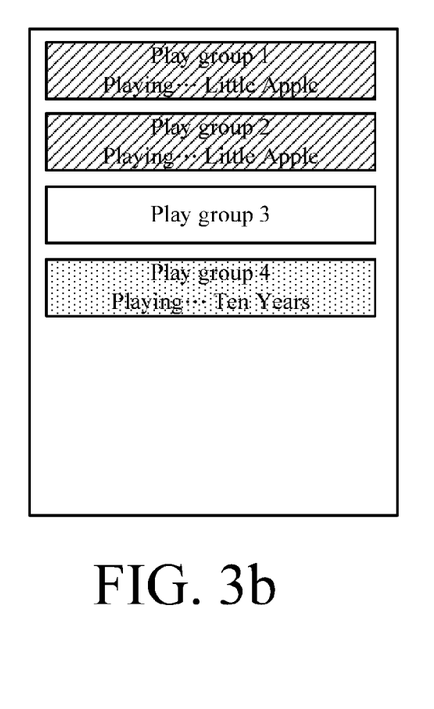

In FIG. 3a, if it is required to activate the play group 2 to simultaneously play the playlist of the play group 1, the finger touches the graphic label of the play group 2 on the intelligent terminal to slide the graphic label to the left, and the identification of the graphic label will change once at a sliding time where the identification is changed between the given identifications of the graphic label on the user interface. As shown in FIG. 3b, when the graphic label pattern of the play group 2 becomes consistent with the graphic label pattern of the play group 1, stop the operation and wait for a predetermined time, such as one second, so that the user's selection is identified and an instruction is transmitted to the play group 2 to allow the play group 2 to acquire the playlist of the play group 1 and to simultaneously play the songs on the same playlist as the play group 1.

In block S205, the identification change operation of the graphic label corresponding to the second play group is received so that the identification change of the graphic label corresponding to the second play group becomes a predetermined identification where the predetermined identification corresponds to the idle status of the second play group 2.

In block S206, the second play group 2 is controlled to stop playing the play files of the current playlist and to enter the idle status.

In FIG. 3b, if it is required to activate the play group 1 to stop the play and enter the idle status, the finger touches the graphic label of the play group 1 on the intelligent terminal to slide the graphic label to the left, and the identification of the graphic label will change once at a sliding time where the identification is changed between the given identifications of the graphic label on the user interface. When the graphic label pattern of the play group 1 becomes a default pattern, such as a blank pattern, stop the operation and wait for a predetermined time, such as one second, so that the user's selection is identified and an instruction is transmitted to the play group 1 to stop the play operation and enter the idle status, as shown in FIG. 3c.

Figure 3C:
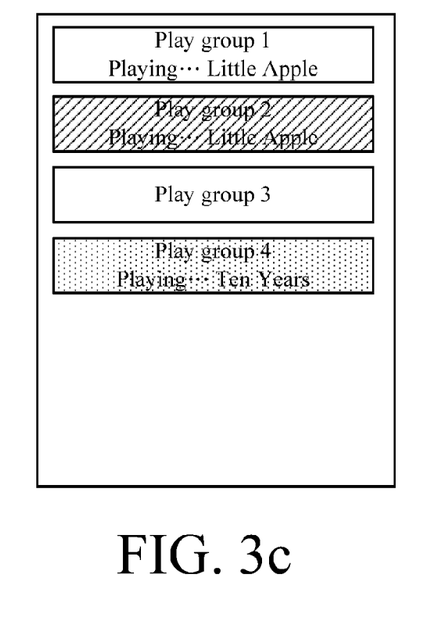
Figure 3D:
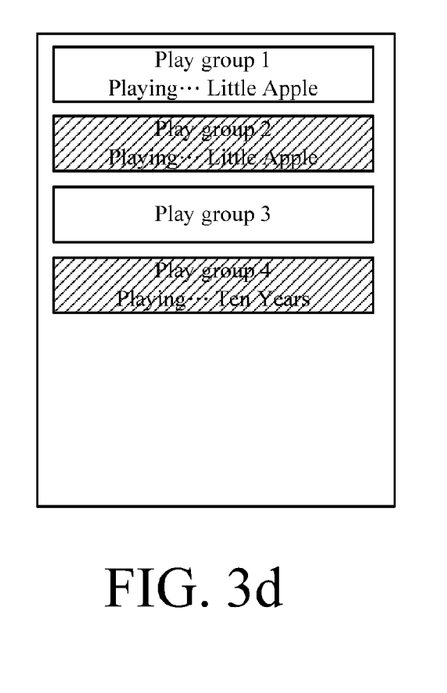

In FIG. 3c, the song which the play group 4 is playing is different from that which the play group 2 is playing. If it is required to activate the play group 4 to simultaneously play the same song which the play group 2 plays, the finger touches the graphic label of the play group 4 on the intelligent terminal to slide the graphic label to the left, and the identification of the graphic label will change once at a sliding time where the identification is changed between the given identifications of the graphic label on the user interface. When the graphic label pattern of the play group 4 becomes consistent with the graphic label pattern of the play group 2, stop the operation and wait for a predetermined time, such as one second, so that the user's selection is identified and an instruction is transmitted to the play group 4 to allow the play group 4 to acquire the playlist of the play group 2 and to simultaneously play the songs on the same playlist as the play group 2, as shown in FIG. 3d.

The operation of sliding the graphic label to the left can be replaced by other operation, such as sliding to the right, a pressing operation of the graphic label for longer time, or other operations combined with physical buttons of intelligent terminal. The purpose of operation is to change the pattern of graphic label corresponding to the play group. Moreover, the identification of the graphic label can be recognized by different colors of the graphic label.

In a control method for switching a playlist of a play system according to one embodiment of the present disclosure, by consisting an identification of the graphic label of the play group with an identification of the graphic label of another current play group which is playing, the current playlist played by another play group is acquired and there is no need to re-assemble the play groups when the play files of the playlist are played, thereby resulting in simplified and convenient operations.

Accompanied with FIGS. 4 and 5, the control method for switching a playlist of a play system is described in the following.

Figure 4:
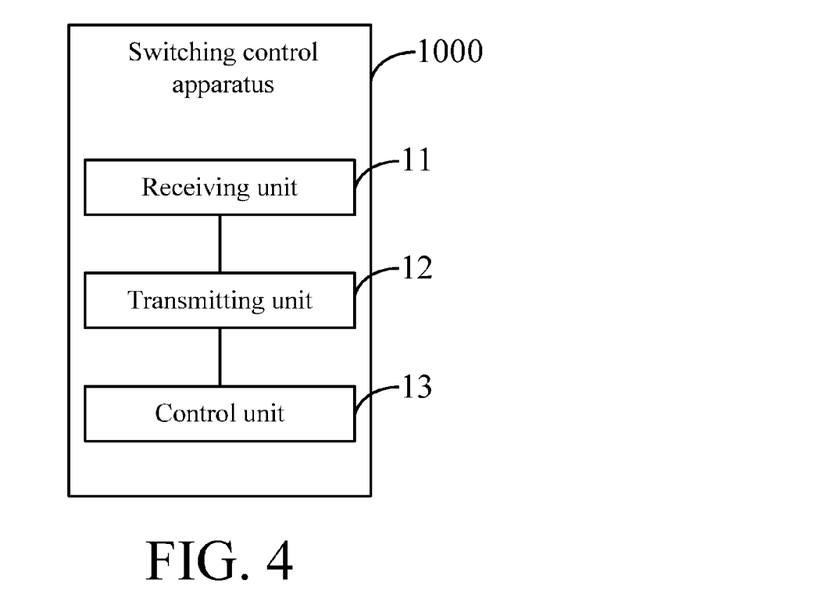
FIG. 4 is a block diagram of a control apparatus for switching the playlist of the play system according to one embodiment of the present disclosure.

Please refer to FIG. 4, which is a block diagram of a control apparatus for switching the playlist of the play system according to one embodiment of the present disclosure. The switching control apparatus 1000 includes a receiving unit 11, a transmitting unit 12 and a control unit 13. In one embodiment, the switching control apparatus 1000 further includes a display unit coupled to control unit 12 for displaying the playlist and related information. A processor is coupled to the switching control apparatus 1000 for executing at least one application program of the control method stored in a storage media.

The receiving unit 11 is configured to receive an identification change operation of a graphic label corresponding to a first play group on a user interface so that the identification change operation of the graphic label corresponding to the first play group is consistent with an identification change operation of a graphic label corresponding to a play status of a second play group.

The present disclosure utilizes an intelligent terminal to switch and control the playlist of the play system and the play group is displayed on the user interface of the intelligent terminal. Each of the play groups is displayed as a graphic label which occupies a display region on the user interface where the graphic label is a rectangular shape, circular shape or other different shapes. The name and status information of the play group is shown on the graphic label where the status information includes a title of song, which is currently played by the play group, and a playing status, such as a play or pause mode. If the play group currently has no playlist, the status information of the play group is empty. If the graphic label of one play group is clicked, the user enters an information interface of the play group which display more detailed information corresponding to the play group where the detailed information includes showing which playing devices compose the play group, browsing and editing the playlist of the play group.

Each play group remains in a status of play or idle of which graphic label correspondingly shows different identification where the identification may be different color or pattern. The identification of the play status in each play group is different but the identification of the idle status of each play group is the same as each other or different from each other.

If the finger touches the graphic label of the play group on the intelligent terminal to slide the graphic label, the identification of the graphic label will change once at a sliding time until the identification of the graphic label of the play group is consistent with a graphic label of a target play group where the identification is changed between the given identifications of the graphic label on the user interface. The operations of touching and sliding the graphic label can be replaced with other operations, such as a sliding operation of the graphic label along different directions, a pressing operation of the graphic label for longer time, or other operations combined with physical buttons of intelligent terminal. The receiving unit 11 receives the identification change operation of the graphic label corresponding to the first play group on the user interface.

The transmitting unit 12 is configured to transmit an acquisition instruction of a playlist to the first play group so that the first play group acquires a current playlist and a current play progress of the second play group via the local area network.

After the receiving unit 11 receives the identification change operation of the graphic label corresponding to the play group, the acquisition instruction of the playlist is transmitted to the play group for triggering the first play group to acquire the current playlist and the current play progress of the target play group by the local area network. The playing devices of the play group are coupled to each other within the network. Therefore, in one embodiment, a control terminal of the play group is capable of acquiring the current playlist and the current play progress of the target play group from the control terminal of the target play group. In another embodiment, the current playlist and the current play progress is stored in one playing device of the target play group so that the control terminal can acquire the current playlist and the current play progress in the one playing device of the target play group. Still in another embodiment, the play group and the target play group are controlled by the same control terminal so that the control terminal is capable of acquiring acquire the current playlist and the current play progress of the target play group from its own information.

The control unit 13 is configured to control at least one playing device of first play group for playing the play files of current playlist of second play group according to the current play progress of second play group.

After acquiring the current playlist and the current play progress of the target play group, the control unit 13 controls the play group in order to synchronously play the play files of current playlist of target play group according to the current play progress.

In a control apparatus for switching a playlist of a play system according to one embodiment of the present disclosure, by consisting an identification of the graphic label of the play group with an identification of the graphic label of another current play group which is playing, the current playlist played by another play group is acquired and there is no need to re-assemble the play groups when the play files of the playlist are played, thereby conveniently simplifying the operations.

Figure 5:
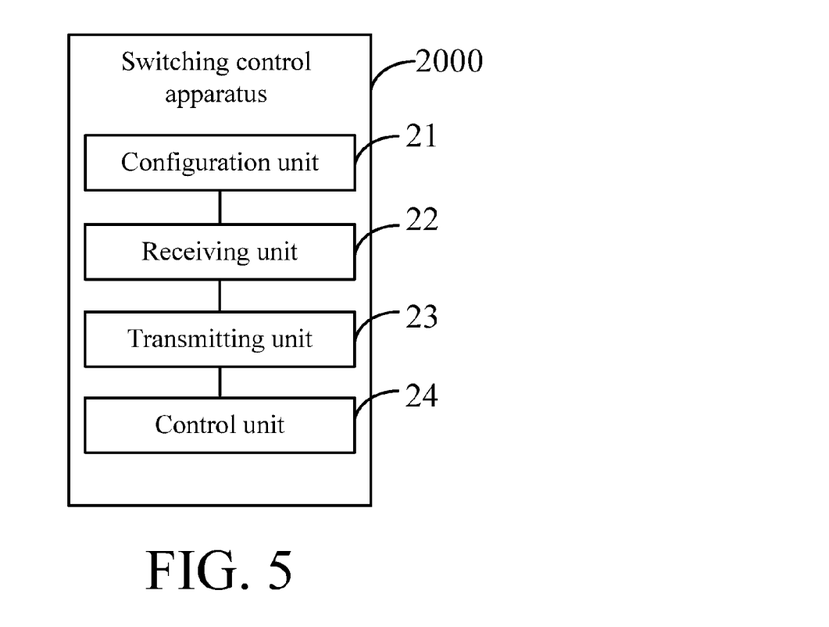
FIG. 5 is a block diagram of a control apparatus for switching the playlist of the play system according to another embodiment of the present disclosure.

Please refer to FIG. 5, which is a block diagram of a control apparatus for switching the playlist of the play system according to another embodiment of the present disclosure. The switching control apparatus 2000 includes a configuration unit 21, a receiving unit 22, a transmitting unit 23 and a control unit 24. In one embodiment, the switching control apparatus 2000 further includes a display unit coupled to control unit 12 for displaying the playlist and related information. A processor is coupled to the switching control apparatus 2000 for executing at least one application program of the control method stored in a storage media.

The configuration unit 21 configures identifications corresponding to a play status and an idle status of each play group of at least two play groups.

The configuration unit 21 configures each play group to be in the play status or idle status of which graphic label correspondingly shows different identification where the identifications can be different colors or patterns. The identification of the play status in each play group is different but the identification of the idle status of each play group is the same as each other or different from each other.

For an example of a music system, FIG. 3a is a user interface of the related play groups. The user interface displays four play groups of the music system including a play group 1, a play group 2, a play group 3, and a play group 3 where the play groups 1 and 4 are in a play status, which are added by a playlist and can be configured in a play status or a pause status, and the play groups 2 and 3 are in an idle status.

In FIG. 3, if a play group is in the idle status, i.e. no playing music, the graphic label of the play group shows a default pattern, such as a blank pattern. If the play group is in the play status, the graphic label of the play group shows a predetermined pattern. Moreover, when many play groups are in the play status, the graphic labels of play groups are configured to be different patterns respectively. As shown in FIG. 3a, the idle play groups 2 and 3 are configured to be a default blank pattern, the play group 1 with the play status is configured to be a slanting pattern, and the play group 4 with the play status is configured as a dot pattern.

The receiving unit 22 receives an identification change operation of a graphic label corresponding to a first play group on a user interface so that the identification change operation of the graphic label corresponding to the first play group is consistent with an identification change operation of a graphic label corresponding to a play status of a second play group.

After the transmitting unit 23 receives a predetermined time of the identification change operation of the graphic label corresponding to the first play group on the user interface, an acquisition instruction of a playlist is transmitted to the first play group so that the first play group acquires a current playlist and a current play progress of the second play group via the local area network.

The control unit 24 controls at least one playing device of first play group for playing the play files of current playlist of second play group according to the current play progress of second play group.

In FIG. 3a, if it is required to activate the play group 2 to simultaneously play the playlist of the play group 1, the finger touches the graphic label of the play group 2 on the intelligent terminal to slide the graphic label to the left, and the identification of the graphic label will change once at a sliding time where the identification is changed between the given identifications of the graphic label on the user interface. As shown in FIG. 3b, when the graphic label pattern of the play group 2 becomes consistent with the graphic label pattern of the play group 1, stop the operation and wait for a predetermined time, such as one second, so that the user's selection is identified and an instruction is transmitted to the play group 2 to allow the play group 2 to acquire the playlist of the play group 1 and to simultaneously play the songs on the same playlist as the play group 1.

The receiving unit 22 receives an identification change operation of the graphic label corresponding to the second play group so that the identification change of the graphic label corresponding to the second play group becomes predetermined identification where the predetermined identification corresponds to the idle status of the second play group 2.

The control unit 24 controls the second play group 2 is controlled to stop playing the play files of the current playlist.

In FIG. 3b, if it is required to activate the play group 1 to stop the play and enter the idle status, the finger touches the graphic label of the play group 1 on the intelligent terminal to slide the graphic label to the left, and the identification of the graphic label will change once at a sliding time where the identification is changed between the given identifications of the graphic label on the user interface. When the graphic label pattern of the play group 1 becomes a default pattern, such as a blank pattern, stop the operation and wait for a predetermined time, such as one second, so that the user's selection is identified and an instruction is transmitted to the play group 1 to stop the play operation and enter the idle status, as shown in FIG. 3c.

In FIG. 3c, the song which the play group 4 is playing is different from that which the play group 2 is playing. If it is required to activate the play group 4 to simultaneously play the same song which the play group 2 plays, the finger touches the graphic label of the play group 4 on the intelligent terminal to slide the graphic label to the left, and the identification of the graphic label will change once at a sliding time where the identification is changed between the given identifications of the graphic label on the user interface. When the graphic label pattern of the play group 4 becomes consistent with the graphic label pattern of the play group 2, stop the operation and wait for a predetermined time, such as one second, so that the user's selection is identified and an instruction is transmitted to the play group 4 to allow the play group 4 to acquire the playlist of the play group 2 and to simultaneously play the songs on the same playlist as the play group 2, as shown in FIG. 3d.

The operation of sliding the graphic label to the left can be replaced by other operation, such as sliding to the right, a pressing operation of the graphic label for longer time, or other operations combined with physical buttons of intelligent terminal. The purpose of operation is to change the pattern of graphic label corresponding to the play group. Moreover, the identification of the graphic label can be recognized by different colors of the graphic label.

In a control method for switching a playlist of a play system according to one embodiment of the present disclosure, by consisting an identification of the graphic label of the play group with an identification of the graphic label of another current play group which is playing, the current playlist played by another play group is acquired and there is no need to re-assemble the play groups when the play files of the playlist are played, thereby conveniently simplifying the operations.

Illustratively, the above-mentioned embodiments of methods are depicted in a series of operations with a simplified description. However, person skilled in the art should be noted that the operations of the present disclosure are descriptive rather than limiting of the sequence of the operations because some operations can be sequentially or simultaneously performed. The person skilled in the art should be noted that the foregoing embodiments are depicted as preferred embodiments and thus the related operations and units are not necessarily implements in the present disclosure.

Since the aforementioned embodiments focus on different aspects respectively, the descriptions, which are not depicted in one embodiment, of some embodiments can correspondingly refer to the related content in another embodiment.

Based on the descriptions of embodiments, person skilled in the art clearly understands that the present disclosure can be performed by software components, hardware components, firmware components and the combinations. When the software components are implemented, the functions of the operations and/or units are stored in computer readable media, or transmitted by one or more instructions and codes within the computer readable media. The computer readable media includes computer storage media and computer communication media where the computer communication media are defined as any available media for transmitting computer instructions from one place to another. The computer storage media are defined as any available media which the computer can access. For example, the computer storage media are selected from Random Access Memory (RAM), Read-Only Memory (ROM), Electrically Erasable Programmable Read-Only Memory (EEPROM), Compact Disc Read-Only Memory (CD-ROM) or other kinds of disc storages, magnetic storage media or other magnetic storage device, and media of which program codes with portable stored instructions or data can be accessed by the computer. Any connection components can be regarded as the computer readable media. For example, if the software components are performed by axial cables, optical fibers, optical cables, twisted-pair cables, Digital Subscriber Line (DSL), or wireless techniques, such as infrared beam, wireless wave and microwave, which are transmitted from the website, server and/or remote source, the axial cables, optical fibers, optical cables, twisted-pair cables, DSL, or infrared beam, wireless wave and microwave of the wireless techniques are defined as the computer readable media. In the present disclosure, the disk and disc includes compact disc (CD), laser disc, Digital Versatile Disc (DVD), floppy disk and Blue Ray discs where the disk can magnetically copy the data and the disc can optically copy the data by laser beams. The above combinations can also be defined as the computer readable media.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A control method of a control apparatus for switching a playlist of a play system, wherein the play system comprises at least two play groups and each play group comprises at least one playing device, and the at least two play groups are coupled to each other via a local area network, the control method comprising:

configuring, by a configuring unit of the control apparatus, identifications respectively corresponding to the play status and an idle status of each play group, the identifications are colors of graphic labels of play groups, an identification corresponding to the play status of each play group is different from each other;

receiving, by a receiving unit of the control apparatus, an identification change operation of a graphic label corresponding to a play status of a first play group on a single user interface so that an identification of the graphic label corresponding to the play status of the first play group is consistent with an identification of a graphic label corresponding to a play status of a second play group, the identification change operation being performed on the user interface;

transmitting, by a transmitting unit of the control apparatus, an acquisition instruction of the playlist to the first play group for triggering the first play group to acquire a current playlist and a current play progress of the second play group via the local area network; and controlling, by a control unit of the control apparatus, at least one playing device of the first play group for playing a play file of the current playlist of the second play group according to the current play progress of the second play group.

2. The control method of claim 1, further comprising:

receiving, by the receiving unit, the identification change operation of the graphic label corresponding to the second play group so that the identification change of the graphic label corresponding to the second play group becomes a predetermined identification wherein the predetermined identification corresponds to an idle status of the second play group; and controlling, by the control unit, the second play group to stop playing the play file of the current playlist.

3. The control method of claim 1, wherein while transmitting the acquisition instruction of the playlist to the first play group, the control method further comprises:

after a predetermined time of the identification change operation of the graphic label corresponding to the first play group on the user interface is received by the receiving unit, the acquisition instruction of the playlist is transmitted to the first play group by the transmitting unit.

4. The control method of claim 1, wherein an identification of an idle status of each play group is the same as each other or different from each other.

5. The control method of claim 3, wherein the first play group acquires the current playlist and the current play progress of the second play group via the local area network.

6. A control apparatus for switching a playlist of a play system, wherein the play system comprises at least two play groups and each play group comprises at least one playing device, and the at least two play groups are coupled via a local area network, the control apparatus comprising:

one or more processors executing computer readable instructions to implement a plurality of units, the plurality of units include a configuration unit, a receiving unit, a transmitting unit and a control unit, wherein the configuration unit, configured to configure identifications respectively corresponding to the play status and an idle status of each play group, wherein the identifications are colors of graphic labels of play groups, an identification corresponding to the play status of each play group is different from each other;

the receiving unit, configured to receive an identification change operation of a graphic label corresponding to a play status of a first play group on a single user interface so that an identification of the graphic label corresponding to the play status of the first play group is consistent with an identification of a graphic label corresponding to a play status of a second play group, the identification change operation being performed on the user interface;

the transmitting unit, configured to transmit an acquisition instruction of the playlist to the first play group for triggering the first play group to acquire a current playlist and a current play progress of the second play group via the local area network; and the control unit, configured to control at least one playing device of first play group for playing a play file of the current playlist of the second play group according to the current play progress of second play group.

7. The control apparatus of claim 6, wherein the receiving unit is further configured to receive the identification change operation of the graphic label corresponding to the second play group so that the identification change of the graphic label corresponding to the second play group becomes a predetermined identification, and wherein the predetermined identification corresponds to an idle status of the second play group; and wherein the control unit is further configured to control the second play group to stop playing the play file of the current playlist.

8. The control apparatus of claim 6, wherein the transmitting unit is further configured to transmit the acquisition instruction of the playlist to the first play group after a predetermined time of the identification change operation of the graphic label corresponding to the first play group on the user interface is received by the receiving unit.

9. The control apparatus of claim 6, wherein an identification of an idle status of each play group is the same as each other or different from each other.

10. The control apparatus of claim 8, wherein the first play group acquires the current playlist and the current play progress of the second play group via the local area network.

11. A computing device comprising a non-transitory computer readable media storing therein at least one application program, and a control apparatus comprising a processor executing the at least one application program, and when the processor of the control apparatus executes the at least one application program, the control apparatus performs a control method for switching a playlist of a play system, wherein the play system comprises at least two play groups and each play group comprises at least one playing device, and the at least two play groups are coupled to each other via a local area network, the control method comprising:

configuring, by a configuring unit of the control apparatus, identifications respectively corresponding to the play status and an idle status of each play group, the identifications are colors of graphic labels of play groups, an identification corresponding to the play status of each play group is different from each other;

receiving, by a receiving unit of the control apparatus, an identification change operation of a graphic label corresponding to a play status of a first play group on a single user interface so that an identification of the graphic label corresponding to the play status of the first play group is consistent with an identification of a graphic label corresponding to a play status of a second play group, the identification change operation being performed on the user interface;

transmitting, by a transmitting unit of the control apparatus, an acquisition instruction of the playlist to the first play group for triggering the first play group to acquire a current playlist and a current play progress of the second play group via the local area network; and controlling, by a control unit of the control apparatus, at least one playing device of the first play group for playing a play file of the current playlist of the second play group according to the current play progress of the second play group.

* * * * *